United States Patent
Lee (10) Patent No.: US 10,522,804 B2
(45) Date of Patent: Dec. 31, 2019

(54) BATTERY MODULE HAVING IMPROVED SAFETY AND OPERATIONAL LIFESPAN

(71) Applicant: LG Chem, Ltd., Seoul (KR)

(72) Inventor: Chul-Kyu Lee, Daejeon (KR)

(73) Assignee: LG Chem, Ltd. (KR)

( * ) Notice: Subject to any disclaimer, the term of this patent is extended or adjusted under 35 U.S.C. 154(b) by 272 days.

(21) Appl. No.: 15/118,721

(22) PCT Filed: Oct. 7, 2015

(86) PCT No.: PCT/KR2015/010619
§ 371 (c)(1),
(2) Date: Aug. 12, 2016

(87) PCT Pub. No.: WO2016/056846
PCT Pub. Date: Apr. 14, 2016

(65) Prior Publication Data
US 2017/0054119 A1      Feb. 23, 2017

(30) Foreign Application Priority Data

Oct. 7, 2014   (KR) .................. 10-2014-0135160

(51) Int. Cl.
*H01M 2/00*   (2006.01)
*H01M 2/10*   (2006.01)

(52) U.S. Cl.
CPC .......... *H01M 2/1094* (2013.01); *H01M 2/10* (2013.01); *H01M 2200/00* (2013.01)

(58) Field of Classification Search
CPC ... H01M 2/10; H01M 2200/00; H01M 2/1094
See application file for complete search history.

(56) References Cited

U.S. PATENT DOCUMENTS

| 7,859,220 B2 * | 12/2010 | Bushong | .......... H02J 7/0045 |
| | | | 320/107 |
| 9,142,809 B2 | 9/2015 | Kim | |
| 2003/0162091 A1 * | 8/2003 | Watanabe | .......... H01M 2/0262 |
| | | | 429/156 |

(Continued)

FOREIGN PATENT DOCUMENTS

| EP | 1341245 A2 | 9/2003 |
| JP | 2001256939 A | 9/2001 |

(Continued)

OTHER PUBLICATIONS

Supplementary Partial European Search Report for Application No. EP15848646 dated Sep. 5, 2017.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP (57) ABSTRACT

The present disclosure discloses a battery module capable of preventing a battery cell from being damaged by vibration or impact. The battery module according to the present disclosure is characterized such that it includes a battery cell, a first cover disposed adjacent to the battery cell to cover one surface of the battery cell, and a first elastic member having elasticity, which is interposed between the battery cell and the first cover.

15 Claims, 11 Drawing Sheets

(56) References Cited

U.S. PATENT DOCUMENTS

| | | |
|---|---|---|
| 2005/0164077 A1 | 7/2005 | Bacon |
| 2007/0058092 A1* | 3/2007 | Ryu .................. F16M 11/08 348/836 |
| 2011/0206979 A1* | 8/2011 | Giroud .................. H01M 4/133 429/162 |
| 2011/0262799 A1 | 10/2011 | Kim |
| 2012/0115012 A1* | 5/2012 | Chen .................. H01M 2/1077 429/159 |
| 2012/0251872 A1 | 10/2012 | Kim |
| 2012/0263983 A1 | 10/2012 | Yoon et al. |
| 2013/0252063 A1 | 9/2013 | Park |
| 2013/0280596 A1 | 10/2013 | Lee et al. |
| 2014/0091748 A1 | 4/2014 | Hermann |
| 2014/0113171 A1 | 4/2014 | Schaefer |
| 2016/0352878 A1* | 12/2016 | Kim .................. G06F 1/1652 |

FOREIGN PATENT DOCUMENTS

| | | |
|---|---|---|
| JP | 2005108693 A | 4/2005 |
| JP | 2005197179 A | 7/2005 |
| JP | 2008186750 A | 8/2008 |
| JP | 200981056 A | 4/2009 |
| JP | 2012129282 A | 7/2012 |
| JP | 2014150039 A | 8/2014 |
| JP | 201553261 A | 3/2015 |
| KR | 20070101025 A | 10/2007 |
| KR | 20110117585 A | 10/2011 |
| KR | 20120077635 A | 7/2012 |
| KR | 20120079441 A | 7/2012 |
| KR | 20120112992 A | 10/2012 |
| KR | 20120116184 A | 10/2012 |
| KR | 10-1255250 B1 | 4/2013 |

OTHER PUBLICATIONS

International Search Report from PCT/KR2015/010619, dated Feb. 11, 2016.
Supplementary European Search Report for Application No. EP15848646, dated Nov. 24, 2017.

* cited by examiner

BATTERY MODULE HAVING IMPROVED SAFETY AND OPERATIONAL LIFESPAN

CROSS-REFERENCE TO RELATED APPLICATION

This application is a national phase entry under 35 U.S.C. § 371 of International Application No. PCT/KR2015/010619, filed Oct. 7, 2015, which claims priority to Korean Patent Application No. 10-2014-0135160, filed Oct. 7, 2014, the disclosures of which are incorporated herein by reference.

TECHNICAL FIELD

The present disclosure relates to a secondary battery, and more particularly, to a battery module including one or more secondary batteries.

BACKGROUND ART

The recently increased demand for portable electronic products such as laptop computers, video cameras, mobile phones, and so on, and the development of electric vehicles, energy storage batteries, robots, satellites, and so on started in earnest led into active researches on high-performance secondary batteries capable of repeated charging and discharging.

Currently, commercially available secondary batteries comprise nickel cadmium, nickel hydrogen, nickel zinc and lithium secondary batteries. Among them, lithium secondary batteries have drawn much attention because of little memory effect to allow unrestrained charging/discharging, as well as very low self-discharging rate and high energy density, compared to nickel-based secondary batteries.

For such secondary batteries, lithium-based oxides and carbon materials are mainly used as positive electrode active materials and negative electrode active materials respectively. A lithium secondary battery comprises an electrode assembly including a positive electrode plate and a negative electrode plate having positive electrode active material and negative electrode active material respectively coated thereon and intervened with a separator therebetween, and an exterior material, i.e., a battery case, which sealingly encases the electrode assembly along with an electrolyte.

Generally, lithium secondary batteries can be classified into a can-type secondary battery and a pouch-type secondary battery according to the shape of the exterior material, in which the can-type secondary battery integrates an electrode assembly into a metal can, and the pouch-type secondary battery integrates an electrode assembly into a pouch made of an aluminum laminate sheet.

Meanwhile, the secondary batteries have recently been widely used in medium- to large-sized devices such as automobiles and power storage devices as well as small-sized devices such as portable electronic appliance. Since the medium- to large-sized devices need high-capacity and/or high-power supply, such medium- to large-sized devices generally use a battery module instead of a single secondary battery, in which a plurality of secondary batteries are electrically connected. Specifically, such battery module generally includes a pouch-type secondary battery in order to facilitate stacking of a plurality of secondary batteries. Accordingly, the battery module may be regarded as an element in which a plurality of secondary batteries are connected in series and parallel in order to increase capacity and power.

Meanwhile, the pouch-type secondary battery has a shortcoming of weak physical strength and it is not suitable for stacking itself. As such, the pouch-type secondary battery is often used in such a form that is interposed between plates or inserted in a cartridge. Such plates or cartridge may form a predetermined shape (e.g., rectangular parallelepiped) to surround the exterior surface of the pouch-type secondary battery for protection of the pouch-type secondary battery or to allow easy stacking.

Meanwhile, considering mobility of the portable electronic appliance or electric vehicle, the secondary battery provided in the portable electronic appliance or electric vehicle is moved together when the portable electronic appliance or electric vehicle is moved. Such moving causes the secondary battery to move, and movement of the secondary battery can cause the secondary battery to be physically damaged by the adjacent components. For example, the pouch-type secondary battery may be damaged due to collision or friction with the plate covering the exterior surface of the pouch-type secondary battery, or with the cartridge in which the secondary battery is inserted. This can result in the exterior material of the pouch-type secondary battery, i.e., the pouch being peeled off or torn.

Such problem is mainly due to the clearance between the pouch-type secondary battery and the adjacent components. However, it is not easy to remove the clearance, and the presence of even a minute clearance can cause the problem mentioned above.

DISCLOSURE

Technical Problem

The present disclosure is designed to solve the problems of the related art, and therefore the present disclosure is directed to providing a battery module capable of preventing a battery cell from being damaged by vibration or impact.

The other objectives and advantages of the present disclosure can be understood with the following description and more clearly with the embodiments of the present disclosure. Also, it should easily be understood that the other objectives and advantages of the present disclosure can be implemented by the means described in the claims and the combinations thereof

Technical Solution

In order to achieve the objects mentioned above, a battery module according to one aspect of the present disclosure is characterized such that it includes a battery cell, a first cover disposed adjacent to the battery cell to cover one surface of the battery cell, and a first elastic member having elasticity, which is interposed between the battery cell and the first cover.

According to one aspect, the first elastic member may be an elastic mat having a predetermined thickness and including an elastic body having elasticity therein.

An interior of the elastic mat may be filled with elastic body.

The elastic body may have a partially varying density.

The elastic body may be densely formed at a center portion such that a density at the center portion of the elastic mat may be relatively greater than a density of a periphery of the elastic mat.

The elastic body may be a spring.

The spring may include two or more springs which may be irregularly disposed within the elastic mat.

Optionally, the springs may be densely formed at a center portion of the elastic mat.

The spring may include two or more springs, and some of the springs may have a different modulus of elasticity from the rest of the springs. Some of the springs may have a relatively greater modulus of elasticity than the rest of springs, and may be disposed at the center portion of the elastic mat.

The elastic mat may have at least one insertion hole formed therein.

The insertion hole may be formed in a direction along which the battery cell, the elastic mat, and the first cover are stacked.

The first cover may have a corresponding protrusion formed at a location corresponding to the insertion hole and in a shape corresponding to the insertion hole.

The corresponding protrusion may be sized to be relatively greater than a size of the insertion hole such that the corresponding protrusion is press-fit into the insertion hole.

According to another aspect, the first elastic member may be a plate spring convexly bent in one direction.

The convex portion of the plate spring may face the battery cell, and the convex portion of the plate spring may be disposed in abutment with the center portion of the battery cell.

The first cover may have a plate shape and be made from a metal.

The battery module may additionally include a second cover disposed adjacent to the battery cell to cover other surface of the battery cell, and a second elastic member having elasticity, interposed between the battery cell and the second cover.

The battery cell may be a pouch-type secondary battery.

In order to achieve the objects mentioned above, an electric vehicle according to another aspect of the present disclosure may include the battery module described above.

Advantageous Effects

According to one aspect of the present disclosure, the elastic member provided on at least one surface of the battery cell can prevent or lessen physical impact between the battery cell and adjacent plates.

According to another aspect of the present disclosure, the elastic member provided on at least one surface of the battery cell can consistently press the battery cell. Accordingly, since the ion transport efficiency inside the battery cell can be enhanced, operational lifespan of the battery cell can be enhanced.

The present disclosure can provide a variety of effects other than those mentioned above, which will become apparent from the following descriptions and further elucidated from the exemplary embodiments of the present disclosure.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Further, in the description of the present disclosure, related known configurations or functions will not be described in detail as it may obscure the subject matter of the present disclosure.

The exemplary embodiments of the present disclosure are provided solely to enable those skilled in the art to more fully understand the present disclosure, and therefore, shapes or sizes of the elements in the drawings may be exaggerated, omitted or schematically illustrated for the sake of clear explanation. Accordingly, the sizes or scales of the respective elements do not necessarily reflect the actual sizes or scales completely.

Figure 1:
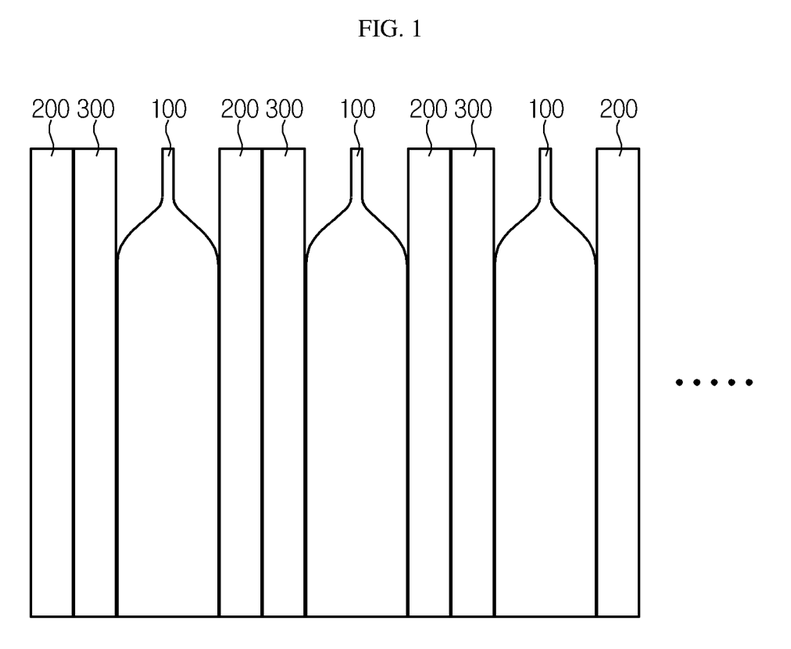
FIG. 1 is a view illustrating a battery module according to an exemplary embodiment of the present disclosure.

FIG. 1 is a view illustrating a battery module according to an exemplary embodiment of the present disclosure.

Referring to FIG. 1, a battery module according to an exemplary embodiment of the present disclosure includes a battery cell 100, a first cover 200, and a first elastic member 300.

The battery cell 100 is a unit cell that can perform charging and discharging, and the battery cell 100 may include an electrode assembly, an electrolyte, and a battery case as basic components.

The electrode assembly may be formed as a unit cell that includes a positive electrode plate with a positive electrode tab attached thereto, a negative electrode plate with a negative electrode tab attached thereto, and a separator, or may be formed as an array of such unit cells. That is, the electrode assembly may include at least one positive electrode plate, at least one separator, and at least one negative electrode plate. Further, the electrode assembly may form an array of unit cells by sequential stacking, or alternatively, stacking followed by winding or folding.

Meanwhile, such positive electrode plate and negative electrode plate may be formed into a structure in which active material slurry is coated on electrode current collectors respectively. The slurry can be generally formed by adding solvent to granular active material, auxiliary conductor, binder, plasticizer, and the like, and stirring the same.

The separator is disposed between the positive electrode plate and the negative electrode plate to insulate the positive electrode plate and the negative electrode plate from each other, and to allow exchange of the active material ions between the positive electrode plate and the negative electrode plate. Another separator may be located on the exterior side of the positive electrode plate or the negative electrode plate to achieve insulation state between the positive electrode plate and the negative electrode plate when the electrode assembly is wound.

The battery case may provide space for encasing the electrode assembly and for injection of the electrolyte. Such cell case may be classified into a rectangular-type battery case and a pouch-type battery case according to shapes. Among these, the pouch-type battery case as the one illustrated in FIG. 1 may include an interior space in a concaved shape such that the electrode assembly and the electrolyte can be encased in such interior space. Further, the pouch-type battery case may be composed of an upper pouch and a lower pouch in order to facilitate encasing of the electrode assembly. In this case, as illustrated in FIG. 1, the pouch-type battery case may include the space in concaved shape for encasing the electrode assembly in both the upper pouch and the lower pouch ('double-cup' type), or include the space in concaved shape in only one of the upper pouch and the lower pouch ('single-cup' type). Further, the upper pouch and the lower pouch may be separated from each other, or may be connected with each other on one shared common side.

Further, the upper pouch and the lower pouch may include seals on the edges of the interior encasing spaces such that the interior encasing spaces can be sealed as the seals are attached to each other.

Preferably, the battery cell 100 may be a pouch-type secondary battery. That is, the battery case may preferably be a pouch-type battery case that can be stably fixed by the first elastic member 300 which will be described below.

The first cover 200 may be disposed adjacent to the battery cell 100 to cover one surface of the battery cell 100. In this case, as illustrated in FIG. 1, the first cover 200 may cover a wide surface of the pouch-type secondary battery.

The first cover 200 may take a plate form and may be formed of metal material. In one example, the first cover 200 may be a part of the cartridge that surrounds the battery cell 100, or in another example, the first cover 200 may be a cooling fin to cool the battery cell 100. In yet another example, the first cover 200 may be a part of the case of the battery module.

The first elastic member 300 is an element interposed between the battery cell 100 and the first cover 200 and may have elasticity. That is, the first elastic member 300 may be interposed between the battery cell 100 and the first cover 200 to prevent the battery cell 100 from moving. Without the first elastic member 300, clearance would be easily formed between the battery cell 100 and the first cover 200. Due to the presence of the clearance as described above, when the battery cell 100 moves, the battery cell 100 and the first cover 200 can collide against each other, thus resulting in problems such as the battery cell 100 being damaged, and so on.

However, the presence of the first elastic member 300 can prevent direct contact between the battery cell 100 and the first cover 200 and also prevent the battery cell 100 from moving. Further, the first elastic member 300 having elasticity allows high compatibility to specifications. That is, the first elastic member 300 may be interposed in tight contact between the battery cell 100 and the first cover 200, although the size of the clearance between the battery cell 100 and the first cover 200 may slightly vary. For example, even when the space between the battery cell 100 and the first cover 200 becomes wider due to contraction of the battery cell 100, the first elastic member 300 may be interposed in tight contact between the battery cell 100 and the first cover 200, and even when the space between the battery cell 100 and the first cover 200 becomes narrower due to expansion of the battery cell 100, the first elastic member 300 may be interposed in tight contact between the battery cell 100 and the first cover 200.

As described above, because the first elastic member 300 may be interposed in tight contact between the battery cell 100 and the first cover 200, the first elastic member 300 may prevent the battery cell 100 from moving.

Moreover, the first elastic member 300 may perform a function of pressing the battery cell 100.

The ion transport of the battery cell 100 will be first described in order to explain effects obtained as a result of the first elastic member 300 pressing the battery cell 100.

As described above, the battery cell 100 includes active material, electrode, and separator having electrolyte impregnated therein. The electrode and the active material are joined with each other by a method such as coating the active material on the surface of the electrode, and so on. During operation of the battery cell 100, ions are separated from the positive electrode active material, pass the separator and the electrolyte of the separator, and move into the negative electrode active material. However, as the battery cell 100 ages, the ion transport efficiency degrades between the positive electrode active material and the negative electrode active material. Accordingly, when the ion transport efficiency is reduced due to aging, a distance between the positive electrode active material and the negative electrode active material may be reduced to enhance the ion transport efficiency. A force in the vertical direction applied onto a side surface (i.e., wide surface) of the battery cell 100 can reduce the distance between the positive electrode active material and the negative electrode active material, and thus enhance the ion transport efficiency.

Accordingly, since the first elastic member 300 is interposed between the first cover 200 and the battery cell 100, the first elastic member 300 may consistently press the battery cell 100 and thus can enhance the ion transport efficiency of the battery cell 100.

According to one aspect, the first elastic member 300 may be an elastic mat M. The elastic mat M may have a predetermined thickness and have an elastic body provided therein. In this case, the elastic body refers to an element with elasticity, and a variety of known elastic bodies may be employed.

Additionally, the elastic mat M may be configured into a form that has a partially varying elasticity. Optionally, the elastic mat M may be configured such that the elastic mat M has a greater elasticity at a center portion than at a periphery to outer boundary of the elastic mat M, in order to further press the center portion of the battery cell 100.

In one example, an interior of the elastic mat M may be filled with elastic body.

Figure 2:
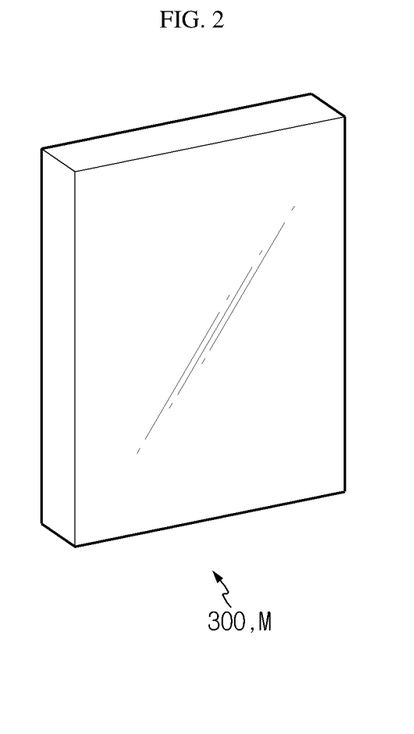
FIG. 2 is a view illustrating a first elastic member according to an exemplary embodiment of the present disclosure.

FIG. 2 is a view illustrating a first elastic member according to an exemplary embodiment of the present disclosure. The first elastic member 300 illustrated in FIG. 2 may be regarded as a perspective of the first elastic member 300 provided in the battery module of FIG. 1.

Referring to FIG. 2, the first elastic member 300 according to an exemplary embodiment of the present disclosure is an elastic mat M whose interior is filled with elastic body. Further, the elastic mat M of FIG. 2 is entirely formed of elastic body. That is, in the exemplary embodiment of FIG. 2, the elastic mat M is made from a same elastic body material.

Referring to FIG. 1 again, the first elastic member 300 of FIG. 2 is illustrated as being interposed between the first cover 200 and the battery cell 100. The elastic mat M is rectangular parallelepiped such that the elastic mat M can be easily inserted between the first cover 200 and the battery cell 100.

Meanwhile, the pouch-type secondary battery has a concave space reserved therewithin to receive the electrode assembly. When the battery cell 100 expands due to swelling phenomenon, and so on, the concave space expands outward, in which case the expansion is mainly occurred at the center portion of the battery cell 100, while the expansion occurs relatively less at the periphery of the battery cell 100.

Figure 3:
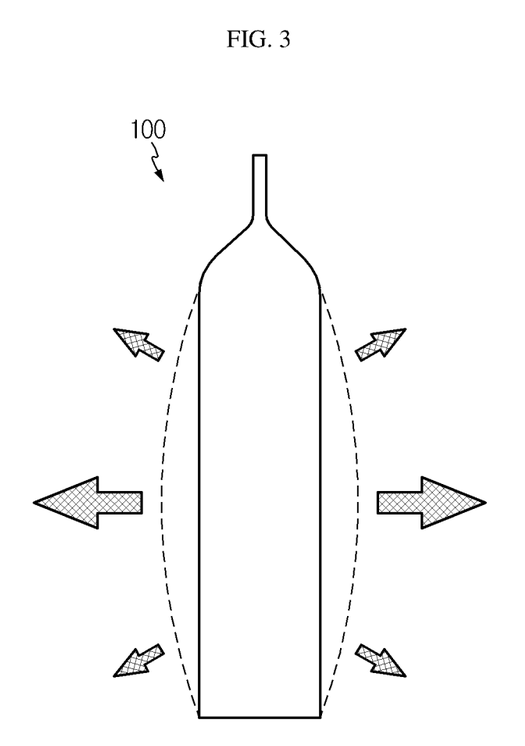
FIG. 3 is a reference view provided to explain a shape into which a pouch-type secondary battery expands.

FIG. 3 is a reference view provided to explain a shape into which a pouch-type secondary battery expands. That is, FIG. 3 can be regarded as a schematic illustration of the battery cell 100 being expanded (see dotted line in FIG. 3), and degree and direction of such expansion (see direction and size of arrows in FIG. 3).

FIG. 3 reveals that, when the pouch-type secondary battery expands, the center portion of the battery cell 100 expands more than the periphery of the battery cell 100 does. Accordingly, it is necessary to further press the center portion of the pouch-type secondary battery in order to prevent the irregular expansion described above.

Hereinafter, an exemplary embodiment will be described, in which the center portion of the pouch-type secondary battery can be further pressed.

Figure 4:
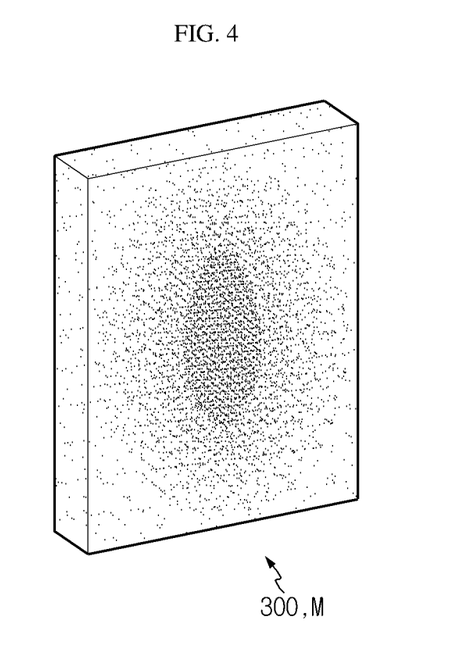
FIG. 4 is a view illustrating a first elastic member according to another exemplary embodiment of the present disclosure.

FIG. 4 is a view illustrating a first elastic member according to another exemplary embodiment of the present disclosure. The present Applicant schematically illustrates the density difference of the elastic body by shading in FIG. 4.

Referring to FIG. 4, the first elastic member 300 according to another exemplary embodiment of the present disclosure is an elastic mat M whose interior is filled with elastic body, and the elastic mat M herein is made from a same elastic body material. Note that, unlike the elastic mat M of FIG. 2, the elastic body filled within the elastic mat M of FIG. 4 is not in regular density. That is, the elastic body forming the elastic mat M of FIG. 4 is filling the elastic mat M in partially varying density. Specifically, according to the exemplary embodiment of FIG. 4, the elastic body is densely formed at the center portion of the elastic mat M such that the elasticity at the center portion of the elastic mat M is greater than the elasticity at the periphery to outer boundary of the elastic mat M. In such structure, the first elastic member 300 is enabled to further press the center portion of the battery cell 100 and to thus inhibit irregular expansion of the battery cell 100.

In another example, the elastic body provided inside the elastic mat M may be implemented as a spring.

Figure 5:
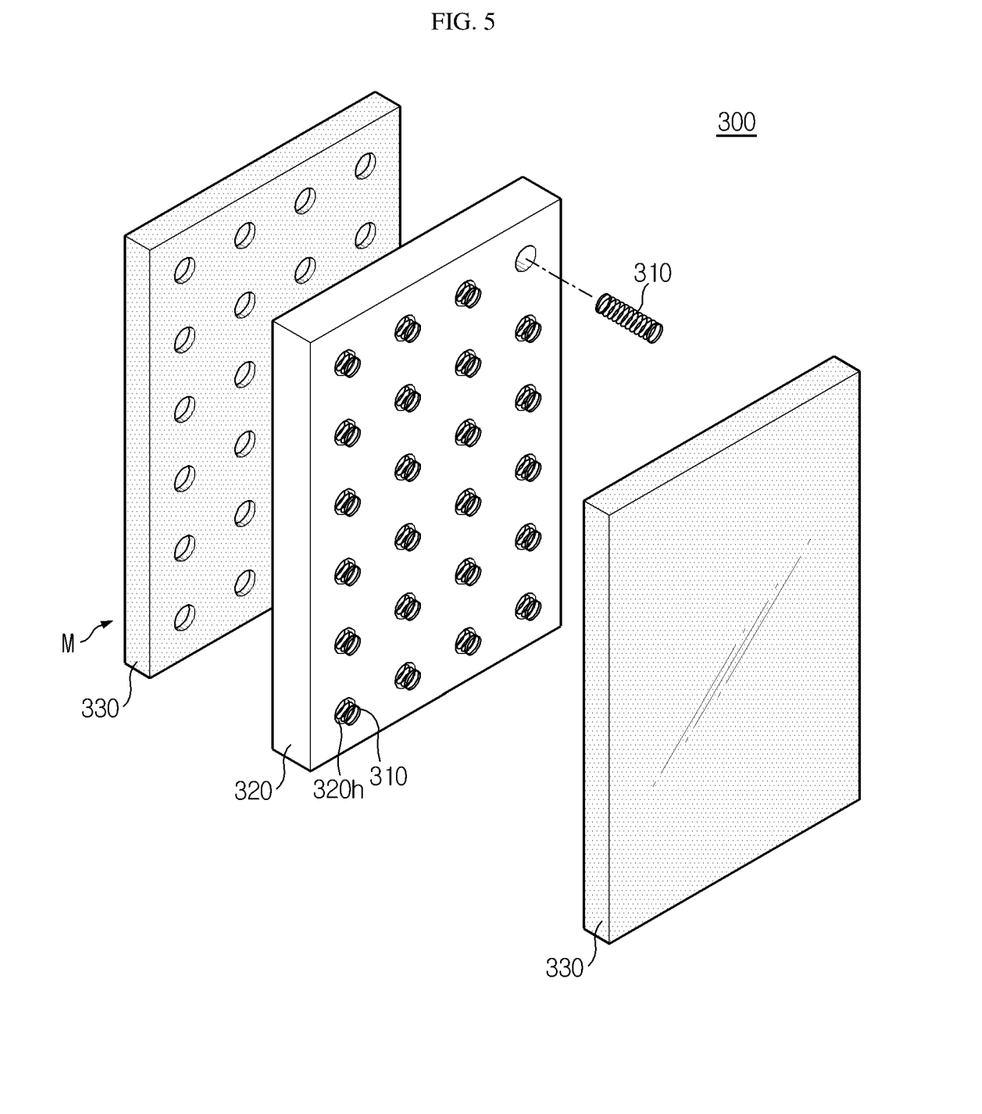
FIG. 5 is an exploded perspective view of a first elastic member according to yet another exemplary embodiment of the present disclosure.
Figure 6:
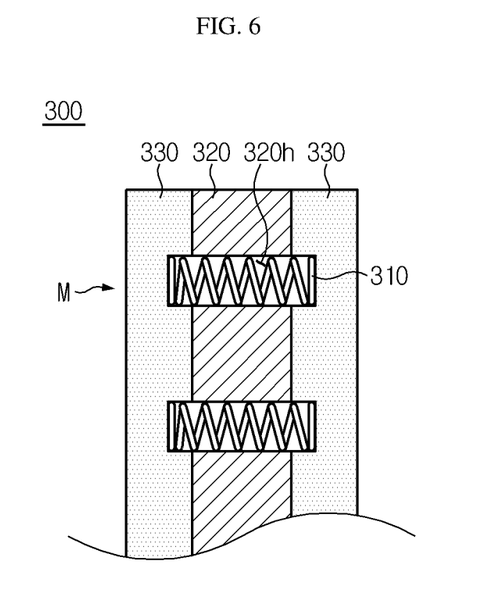
FIG. 6 is a cross sectional view of the first elastic member of FIG. 5 in an assembled state.

FIG. 5 is an exploded perspective view of a first elastic member according to yet another exemplary embodiment of the present disclosure, and FIG. 6 is a cross sectional view of the first elastic member of FIG. 5 in an assembled state.

Referring to FIGS. 5 and 6, the first elastic member 300 according to yet another exemplary embodiment of the present disclosure is an elastic mat M having a spring 310 provided therein. That is, the elastic mat M has one or more springs 310 regularly disposed therein, with the springs 310 being surrounded by the mat cover. Meanwhile, the mat cover is preferably implemented with a soft material to directly transfer the elasticity of the elastic body, i.e., springs 310, to outside. For example, the mat cover may be made from fabric.

Further, the elastic mat M has a spring frame 320 provided therein to support the springs 310 and fix the positions of the springs 310. The spring frame 320 firmly secures the springs 310 such that the springs 310 are not separated from the original positions. For example, as illustrated in FIGS. 5 and 6, one or more holes 320h may be formed in the spring frame 320 to provide space for the springs 310 to pass through. Further, a filler 330 is filled between the spring frame 320 and the mat cover. For example, the filler 330 may be a sponge. The filler 330 fills the periphery of the protruding springs 310, plays a role of preventing the springs 310 from a direct contact with the mat cover, and in cooperation with the spring frame 320, maintaining the shape of the elastic mat M. According to the exemplary embodiment described above, it is easy to insert the elastic mat M between the battery cell 100 and the first cover 200. Moreover, because the springs 310 are surrounded by the filler and the mat cover, direct contact between ends of the springs 310 and the battery cell 100 is prevented, and thus, the damages to the battery cell 100 due to the springs 310 can be prevented.

Figure 7:
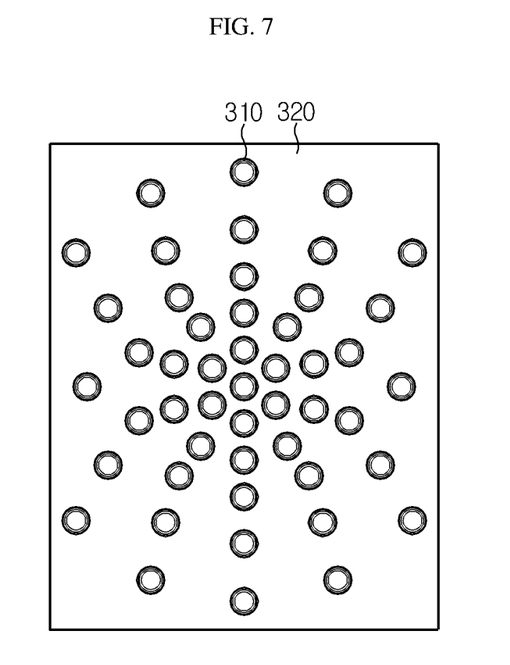
FIG. 7 is a front view of a first elastic member according to yet another exemplary embodiment of the present disclosure.

FIG. 7 is a front view of a first elastic member according to yet another exemplary embodiment of the present disclosure.

Referring to FIG. 7, the first elastic member 300 according to yet another exemplary embodiment of the present disclosure is an elastic mat M having a spring 310 provided therein. Compared with the elastic mat M illustrated in FIGS. 5 and 6, the elastic mat M illustrated in FIG. 7 is different in view of the fact that the springs 310 provided therein are irregularly disposed. That is, the springs 310 in the exemplary embodiment of FIG. 7 are densely disposed at the center portion of the elastic mat M. Further, the spring frame 320 is configured such that the springs 310 can be densely disposed at the center portion of the elastic mat M as mentioned above.

In such structure, the center portion of the battery cell 100 can be further pressed, and thus, irregular expansion of the battery cell 100 can be inhibited.

In another exemplary embodiment in which the center portion of the battery cell 100 is further pressed, instead of irregularly disposing the springs 310, the modulus of elasticity of the springs 310 disposed inside may be varied. That is, some of the springs 310 may have a relatively greater modulus of elasticity than the rest of the springs 310. Further, one or more springs 310 with a relatively greater modulus of elasticity may be disposed at the center portion of the elastic mat M.

Optionally, the first elastic member 300 may be coupled with the first cover 200.

Figure 8:
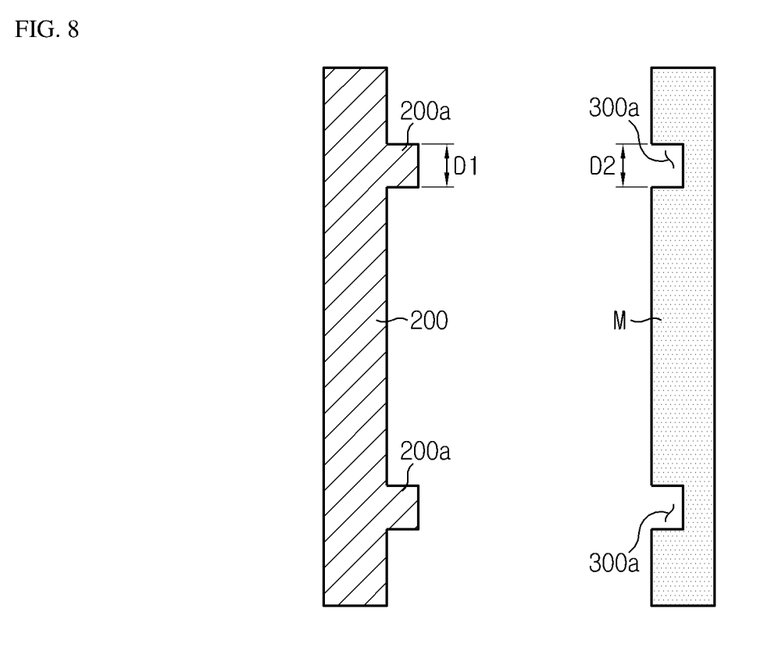
FIG. 8 is a view illustrating a shape before assembling of a first cover and a first elastic member as components of a battery module, according to another exemplary embodiment of the present disclosure.
Figure 9:
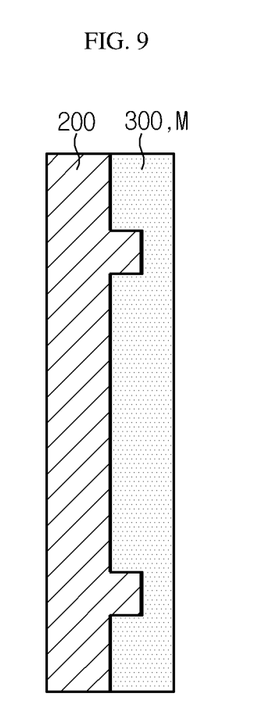
FIG. 9 is a view illustrating the first cover and the first elastic member of FIG. 8 after these are assembled.

FIG. 8 is a view illustrating a shape before assembling of a first cover and a first elastic member as components of a battery module, according to another exemplary embodiment of the present disclosure, and FIG. 9 is a view illustrating the first cover and the first elastic member of FIG. 8 after these are assembled.

Referring to FIGS. 8 and 9, the battery module according to another exemplary embodiment includes a first elastic member 300, and a first cover 200.

Further, the first elastic member 300 is implemented as an elastic mat M. That is, the elastic mat M of FIGS. 8 and 9 may be regarded as a modification of the elastic mat M illustrated in FIGS. 1 and 2.

The elastic mat M illustrated in FIGS. 8 and 9 has one or more insertion holes 300a formed therein. Further, the insertion holes 300a are formed along a direction in which the battery cell 100, the elastic mat M, and the first cover 200 are stacked. In other words, the insertion holes 300a are formed in left-right direction that is a direction along which the first cover 200, the elastic mat M, and the battery cell 100 are stacked in sequence, and the insertion holes 300a are formed in a direction adjacent to the first cover 200.

Further, the first cover 200 has corresponding protrusions 200a in a shape corresponding to the insertion holes 300a. Specifically, the corresponding protrusions 200a are in cylindrical shape, and the insertion holes 300a are formed as cylindrical holes. Further, the corresponding protrusions 200a are formed at locations corresponding to the insertion holes 300a.

Optionally, the size of the corresponding protrusions 200a may be equal to that of the insertion holes 300a, or greater than that of the insertion holes 300a.

In the exemplary embodiment illustrated in FIGS. 8 and 9, the corresponding protrusions 200a are configured such that the size thereof is relatively greater than that of the insertion holes 300a. That is, the diameter of the corresponding protrusions 200a is relatively greater than the diameter of the cylindrical holes. In other words, the corresponding protrusions 200a may be formed in a relatively greater size than the size of the insertion holes 300a such that the corresponding protrusions 200a may be press-fit into the insertion holes 300a.

As illustrated in FIGS. 8 and 9, the elastic mat M is coupled with the first cover 200 with the insertion holes 300a and the corresponding protrusions 200a, and then the first cover 200 is disposed adjacent to the battery cell 100 such that the elastic mat M may be interposed between the battery cell 100 and the first cover 200.

According to another aspect, the first elastic member 300 may be a plate spring P. In this case, the plate spring represents an element that is a plate-shaped member for bending and providing elasticity.

Figure 10:
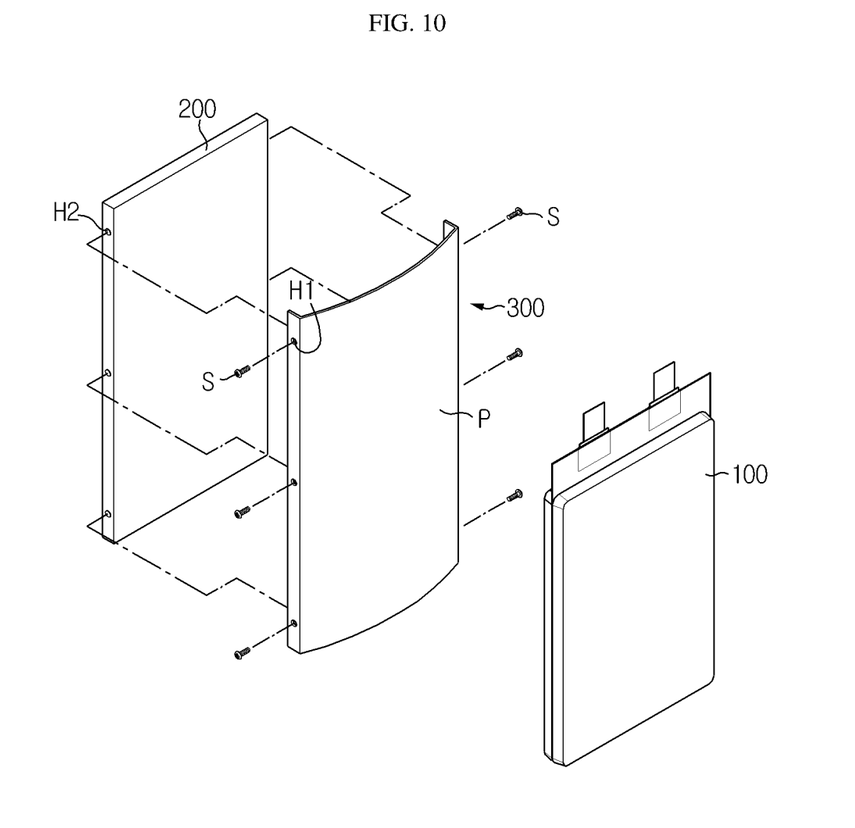
FIG. 10 is a view illustrating a first elastic member being interposed between a battery cell and a first cover according to yet another exemplary embodiment of the present disclosure.

FIG. 10 is a view illustrating a first elastic member being interposed between a battery cell and a first cover according to yet another exemplary embodiment of the present disclosure.

Referring to FIG. 10, the battery cell 100, the first cover 200, and a first elastic member 300 are shown, in which the first elastic member 300 is a plate spring P. The plate spring P is configured to bend convexly to one direction. More specifically, the center portion of the plate spring P may bend convexly. Further, the plate spring P is disposed such that the convex portion faces the battery cell 100, while the concave portion faces the first cover 200. Specifically, it is desirable that the convex portion of the plate spring P is in abutment with the center portion of the battery cell 100. Preferably, the plate spring P may be configured such that both ends of the plate spring P are coupled to the first cover 200. In the exemplary embodiment of FIG. 10, although it is illustrated that a hole H1 is formed in the plate spring P, a hole H2 is formed on a side surface of the plate of the first cover 200, and both ends of the plate spring P are coupled with screw (S) to the side surface of the first cover 200, the coupling between the plate spring P and the first cover 200 is not limited thereto.

Figure 11:
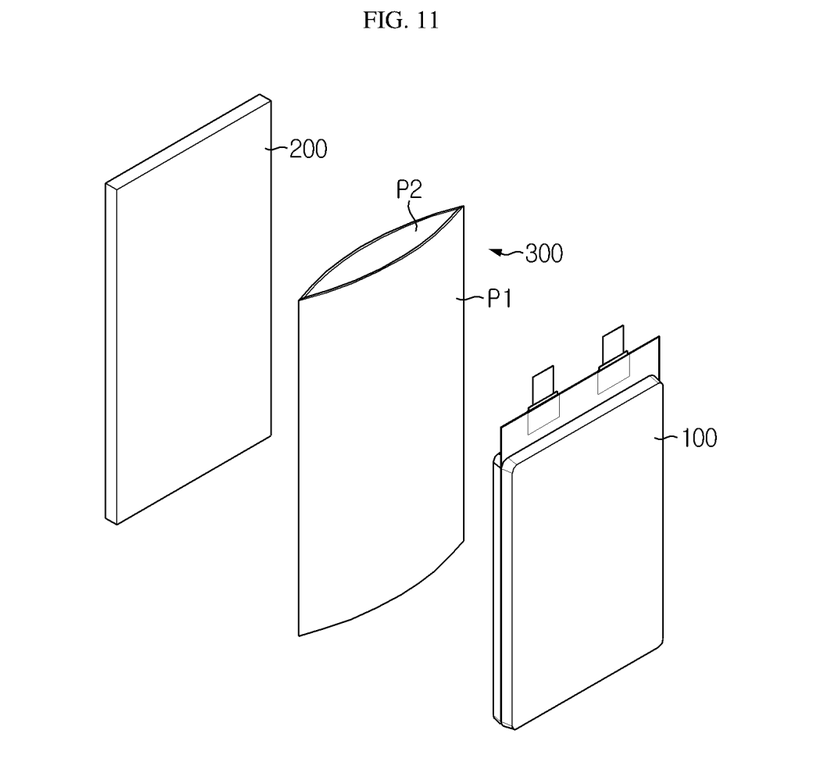
FIG. 11 is a view illustrating a first elastic member being interposed between a battery cell and a first cover according to yet another exemplary embodiment of the present disclosure.

FIG. 11 is a view illustrating a first elastic member being interposed between a battery cell and a first cover according to yet another exemplary embodiment of the present disclosure.

Referring to FIG. 11, the battery cell 100, the first cover 200, and the first elastic member 300 are shown, in which the first elastic member 300 is a plate spring. When compared with FIG. 10, the first elastic member 300 illustrated in the exemplary embodiment of FIG. 11 is coupled such that two plate springs P1, P2 convexly bent in one direction face each other. Accordingly, the convex portion of one P1 of the plate springs faces the battery cell, and the convex portion of the other P2 of the plate springs faces the first cover 200. In the exemplary embodiment of FIG. 11, two plate springs P1, P2 are coupled with each other. However, it is of course possible that an integral plate spring may be formed in the same shape as if two plate springs are coupled with each other.

Meanwhile, as described above, the first cover 200 and the first elastic member 300 may be disposed on one surface of the battery cell 100. However, there may be a second cover and a second elastic member disposed on the other surface of the battery cell 100 in the similar manner.

The second cover may be disposed adjacent to the battery cell 100 to cover the other surface of the battery cell 100, and the second elastic member having elasticity may be interposed between the battery cell 100 and the second cover. The second cover and the second elastic member will not be redundantly described herein, but referenced to the description about the first cover 200 and the first elastic member 300 provided above as the description may overlap.

Figure 12:
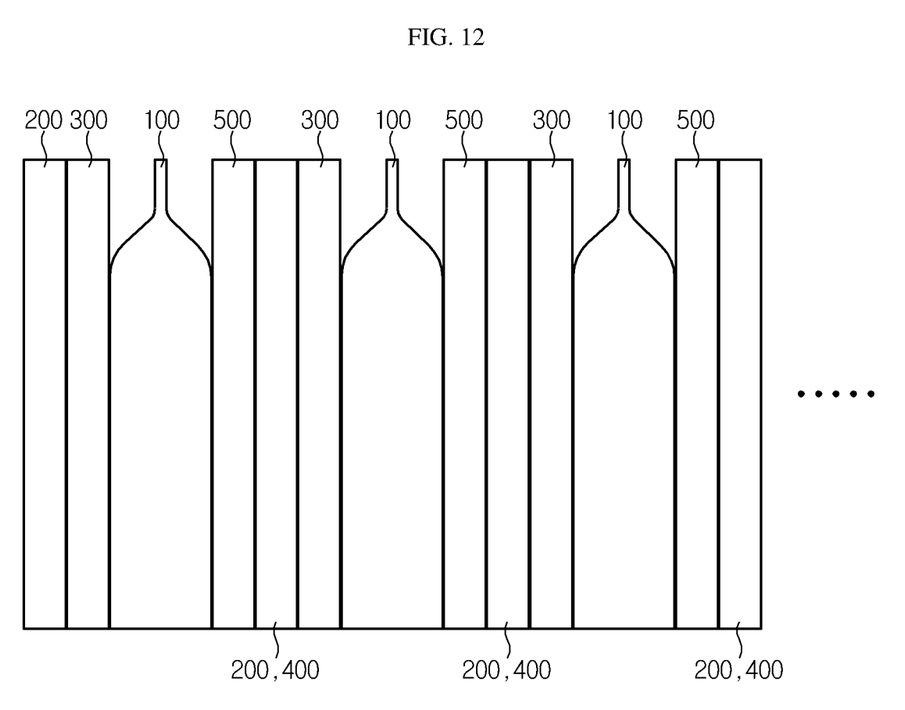
FIG. 12 is a view illustrating a battery module according to yet another exemplary embodiment of the present disclosure.

FIG. 12 is a view illustrating a battery module according to yet another exemplary embodiment of the present disclosure.

Referring to FIG. 12, the battery module according to yet another exemplary embodiment includes not only the first elastic member 300, but also a second elastic member 500. Between the battery cell 100 and the battery cell 100, a plate is provided, having a first cover 200 with reference to one 100 of the battery cells, and a second cover 400 with reference to the other 100 of the battery cells.

One surface of the battery cell 100 is in contact with the first elastic member 300 and the other surface is in contact with the second elastic member 500 such that the battery cell 100 is not moved. Further, as the battery cell 100 is pressed by the elastic members 300, 500 on both surfaces, ion transport efficiency can be enhanced.

Meanwhile, the battery module described above may be packaged within the case to construct a battery pack, and may construct a part of an electric vehicle or ESS.

Meanwhile, while the terms such as "up", "down", "left", "right", "in", "out" indicative of directions are used herein, such terms are used solely for convenience of explanation, and those skilled in the art will be easily able to understand that the terms can be expressed differently according to the an object as a subject of the explanation, viewing position of an observer, position where the object is placed, and so on.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A battery module, comprising:
   a battery cell having at least one positive electrode plate, at least one separator, and at least one negative electrode plate stacked in a first direction;
   a first cover disposed adjacent to the battery cell to cover one surface of the battery cell; and
   a first elastic member having elasticity and being interposed between the battery cell and the first cover along the first direction,
   wherein the first elastic member is an elastic mat having a predetermined thickness and comprising two or more springs therein,
   wherein some of the springs have a different modulus of elasticity from the rest of the springs.

2. A battery module, comprising:
   a battery cell having at least one positive electrode plate, at least one separator, and at least one negative electrode plate stacked in a first direction;
   a first cover disposed adjacent to the battery cell to cover one surface of the battery cell; and
   a first elastic member having elasticity and being interposed between the battery cell and the first cover along the first direction,
   wherein the first elastic member is an elastic mat having a predetermined thickness, wherein an interior of the elastic mat is filled with two or more springs,
   wherein the springs are densely formed at a center portion of the elastic mat.

3. The battery module of claim 1, wherein the some of the springs have a relatively greater modulus of elasticity than the rest of springs, and are disposed at a center portion of the elastic mat.

4. The battery module of claim 1, wherein the first cover has a plate shape and is made from a metal.

5. The battery module of claim 1, further comprising:
   a second cover disposed adjacent to the battery cell to cover other surface of the battery cell; and
   a second elastic member having elasticity and being interposed between the battery cell and the second cover.

6. An electric vehicle comprising the battery module according to claim 1.

7. The battery module of claim 2, wherein the first cover has a plate shape and is made from a metal.

8. The battery module of claim 2, further comprising:
   a second cover disposed adjacent to the battery cell to cover other surface of the battery cell; and
   a second elastic member having elasticity and being interposed between the battery cell and the second cover.

9. An electric vehicle comprising the battery module according to claim 2.

10. The battery module of claim 2, wherein the elastic mat includes a mat cover surrounding the two or more springs.

11. The battery module of claim 10, wherein the mat cover is made of fabric.

12. The battery module of claim 10, wherein the elastic mat includes a spring frame to support and fix the positions of the two or more springs.

13. The battery module of claim 12, wherein the spring frame includes holes in which respective springs of the two or more springs are disposed.

14. The battery module of claim 12, wherein the spring frame includes a filler between the spring frame and the mat cover.

15. The battery module of claim 14, wherein the filler is a sponge.

* * * * *